United States Patent
Ishikawa

(10) Patent No.: US 8,284,465 B2
(45) Date of Patent: Oct. 9, 2012

(54) IMAGE SCANNER, AND METHOD AND COMPUTER READABLE MEDIUM THEREFOR

(75) Inventor: Hiroko Ishikawa, Aichi (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 565 days.

(21) Appl. No.: 12/506,676

(22) Filed: Jul. 21, 2009

(65) Prior Publication Data

US 2010/0020370 A1    Jan. 28, 2010

(30) Foreign Application Priority Data

Jul. 22, 2008   (JP) ................................ 2008-188788

(51) Int. Cl.
*H04N 1/04*   (2006.01)

(52) U.S. Cl. ........ 358/498; 358/474; 358/497; 358/496; 399/405

(58) Field of Classification Search .................. 358/474, 358/498, 497, 496, 486, 494; 399/19, 21, 399/79, 405, 410, 407–409
See application file for complete search history.

(56) References Cited

U.S. PATENT DOCUMENTS

| | | | |
|---|---|---|---|
| 5,850,478 A * | 12/1998 | Suzuki et al. .................. 382/204 |
| 6,236,450 B1 | 5/2001 | Ogura | |
| 6,449,440 B1 * | 9/2002 | Sawada ............................ 399/19 |
| 7,686,302 B2 * | 3/2010 | Tanahashi et al. ........ 271/265.01 |
| 7,722,026 B2 * | 5/2010 | Hirate et al. ................ 271/10.02 |
| 7,847,982 B2 * | 12/2010 | Mizumukai .................... 358/400 |
| 7,924,475 B2 * | 4/2011 | Suzuki ........................... 358/474 |
| 2006/0140649 A1 * | 6/2006 | Ichihashi ......................... 399/17 |
| 2010/0020370 A1 * | 1/2010 | Ishikawa ........................ 358/498 |

FOREIGN PATENT DOCUMENTS

| | | |
|---|---|---|
| JP | SHO 60-8836 | 1/1985 |
| JP | HEI 5-94064 | 4/1993 |
| JP | HEI9-18643 | 1/1997 |
| JP | 2000-98821 | 4/2000 |
| JP | 2001-285588 | 10/2001 |

(Continued)

OTHER PUBLICATIONS

Japanese Official Action dated Jun. 29, 2010 with English language translation.

(Continued)

*Primary Examiner* — Negussie Worku

(74) *Attorney, Agent, or Firm* — Scully, Scott, Murphy & Presser, P.C.

(57) ABSTRACT

An image scanner includes a feeding unit performing document feeding to sequentially feed sheets, a flatbed glass being loaded with a sheet thereon, a scanning unit performing document scanning in any one of a first mode for sequentially scanning sheets being fed by the feeding unit and a second mode for scanning each sheet which is placed on the flatbed glass on a sheet-by-sheet basis, an interrupting unit detecting an error during the document feeding and interrupting the document feeding, an identifying unit identifying damaged sheets among document sheets to be scanned, and a controller configured to, after the interrupted document feeding is released with the detected error being settled, control the scanning unit to perform the document scanning in the second mode for the damaged sheets and in the first mode for undamaged sheets other than the damaged sheets.

18 Claims, 14 Drawing Sheets

FOREIGN PATENT DOCUMENTS

| | | |
|---|---|---|
| JP | 2001-285596 | 10/2001 |
| JP | 2001-296703 | 10/2001 |
| JP | 3248420 | 11/2001 |
| JP | 2005-247519 | 9/2005 |
| JP | 2005-252785 | 9/2005 |
| JP | 2005-274941 | 10/2005 |
| JP | 2006-135669 | 5/2006 |
| JP | 2006-184511 | 7/2006 |
| JP | 3875978 | 11/2006 |
| JP | 2006-339830 | 12/2006 |
| JP | 3935154 | 3/2007 |
| JP | 3935155 | 3/2007 |
| JP | 3954588 | 5/2007 |
| JP | 2007-221246 | 8/2007 |

OTHER PUBLICATIONS

Japanese Official Action dated Apr. 13, 2010 with English language translation.

* cited by examiner

┌─────────────────────────────────────┐
│ ┌─ 40                               │
│                                     │
│  WOULD YOU LIKE TO RESTART DOCUMENT SCANNING? │
│    START KEY  : RESTART             │
│    STOP KEY   : STOP                │
│  ─────────────────────────────────  │
│  PLEASE PRESS START KEY OR STOP KEY │
└─────────────────────────────────────┘

FIG.10

┌─────────────────────────────────────┐
│ ┌─ 40                               │
│                                     │
│   PLEASE INPUT NUMBER OF JAMMED SHEETS │
│                                     │
│                                 01  │
│  ─────────────────────────────────  │
│  PLEASE PRESS START KEY TO SET YOUR INPUT │
└─────────────────────────────────────┘

FIG.11

┌─────────────────────────────────────┐
│ ┌─ 40                               │
│                                     │
│   PLEASE SELECT SOURCE FOR SCANNING JAMMED SHEETS │
│   ▮1 : ADF▮                         │
│    2 : FB                           │
│   PLEASE SELECT "2" IN CASE OF SHEETS DAMAGED │
│  ─────────────────────────────────  │
│  PLEASE PRESS START KEY             │
└─────────────────────────────────────┘

FIG.12

```
┌─────────────────────────────────────────────┐
│  DOCUMENT SCANNING IS COMPLETED UP TO FIRST SIDE OF │
│  5th SHEET                                  │
│                                             │
│  ─────────────────────────────────────────  │
│  PLEASE PRESS START KEY                     │
└─────────────────────────────────────────────┘
```

FIG.16

```
┌─────────────────────────────────────────────┐
│  IS THERE NEXT DOCUMENT SHEET TO BE SCANNED IN FB METHOD? │
│  ▮1:YES▮                                    │
│   2:NO                                      │
│  ─────────────────────────────────────────  │
│  PLEASE PRESS START KEY OR STOP KEY         │
└─────────────────────────────────────────────┘
```

PLEASE INPUT PAGE NUMBERS OF JAMMED SHEET

01

PLEASE PRESS START KEY TO SET YOUR INPUT

FIG.20

IMAGE SCANNER, AND METHOD AND COMPUTER READABLE MEDIUM THEREFOR

CROSS-REFERENCE TO RELATED APPLICATION

This application claims priority under 35 U.S.C. §119 from Japanese Patent Application No. 2008-188788 filed on Jul. 22, 2008. The entire subject matter of the application is incorporated herein by reference.

BACKGROUND

1. Technical Field

The following description relates to one or more techniques to scan images on document sheets, particularly to one or more techniques that use a function to scan an image on a sheet being conveyed with an image sensor set in a static state and a function to scan an image on a statically-placed sheet with the image sensor set in a moving state.

2. Related Art

An image scanner, which incorporates therein an Automatic Document Feeder (ADF) configured to automatically scan plural document sheets, has been known. In the ADF, document sheets loaded on a document tray are fed to a document scanning position sequentially on a sheet-by-sheet basis. Each document sheet is conveyed by the ADF, and scanned in the document scanning position by a scanner unit, and fed to a catch tray. Image processing for image quality correction is, as required, applied to the scanned image data.

The ADF may interrupt document feeding due to a jam. In such a situation, after interrupting the document feeding, the ADF informs a user of a jam caused with a message displayed. For example, Japanese Patent Provisional Publication No. HEI9-18643 discloses, as a process to be executed after a jam occurs, an operation of informing that the user should set predetermined document sheets on the document tray depending on the number of document sheets already scanned.

SUMMARY

However, the aforementioned known image scanner has the following problem. A document sheet which has been jammed in the document feeding is likely to have damages such as folds and wrinkles. On the other hand, the known ADF performs document feeding under the same condition regardless of the state of each document sheet to be scanned, namely, regardless of whether each document sheet to be scanned is damaged or not. Therefore, damaged sheets are set on the document tray and fed again. However, the damaged sheet is likely to cause a jam relatively in comparison with a normal sheet. Hence, the damaged sheet might cause a jam again, and it results in a long time taken for completing the document scanning. Further, when a jam is repeatedly caused, the damage level of the damaged sheet might be worsened. In order to prevent a jam from being repeatedly caused, it is considered as one of possible solutions to scan all the document sheets on a flatbed glass. However, when the number of the document sheets is large, it leads to a serious burden placed on a user and inefficiency.

Aspects of the present invention are advantageous to provide one or more improved image scanners (and methods and computer readable media therefor) that make it possible to prevent a jam from being repeatedly caused and to deliver high efficiency in document scanning.

According to aspects of the present invention, an image scanner is provided, which includes a feeding unit configured to perform document feeding to sequentially feed sheets, a flatbed glass configured to be loaded with a sheet thereon, a scanning unit configured to perform document scanning in any one of a first mode and a second mode, the first mode being a method for sequentially scanning sheets being fed by the feeding unit, the second mode being a method for scanning each sheet which is placed on the flatbed glass on a sheet-by-sheet basis, an interrupting unit configured to detect an error during the document feeding with the feeding unit and to interrupt the document feeding, an identifying unit configured to identify one or more damaged sheets among document sheets to be scanned, and a controller configured to, after the interrupted document feeding is released with the detected error being settled, control the scanning unit to perform the document scanning in the second mode for the damaged sheets identified by the identifying unit and in the first mode for undamaged sheets other than the damaged sheets among the document sheets to be scanned.

In some aspects of the present invention, the image scanner is capable of the document scanning in any one of the first mode and the second mode. Further, the identifying unit identifies one or more damaged sheets among document sheets to be scanned. It is noted that sheets satisfying a predetermined condition (for example, sheets to be scanned immediately after the document feeding is resumed, which document feeding has been interrupted due to an error such as a jam during the document scanning in the first mode) may automatically be identified as the damaged sheets. Alternatively, sheets specified through a user manual operation may be identified as the damaged sheets.

According to aspects of the present invention, further provided is a method for performing document scanning with an image scanner that has a feeding unit configured to sequentially feed sheets and a flatbed glass configured to be loaded with a sheet thereon. The method includes a feeding step of performing document feeding with the feeding unit, an interrupting step of detecting an error during the document feeding with the feeding unit and interrupting the document feeding, a resuming step of resuming the document feeding interrupted in the interrupting step after the detected error is settled, an identifying step of identifying one or more damaged sheets among document sheets to be scanned, and a scanning step of perform the document scanning in a first mode for undamaged sheets other than the damaged sheets among the document sheets to be scanned and in a second mode for the damaged sheets identified in the identifying step, the first mode being a method for sequentially scanning sheets being fed by the feeding unit, the second mode being a method for scanning each sheet which is placed on the flatbed glass on a sheet-by-sheet basis.

According to aspects of the present invention, further provided is a computer readable medium having computer readable instructions stored thereon. The instructions cause an image scanner, which has a feeding unit configured to sequentially feed sheets and a flatbed glass configured to be loaded with a sheet thereon, to perform a feeding step of performing document feeding with the feeding unit, an interrupting step of detecting an error during the document feeding and interrupting the document feeding, a resuming step of resuming the document feeding interrupted in the interrupting step after the detected error is settled, an identifying step of identifying one or more damaged sheets among document sheets to be scanned, and a scanning step of perform the document scanning in a first mode for undamaged sheets other than the damaged sheets among the document sheets to be scanned and in a second mode for the damaged sheets identified in the identifying step, the first mode being a method for sequentially scanning sheets being fed by the feeding unit, the second mode being a method for scanning each sheet which is placed on the flatbed glass on a sheet-by-sheet basis.

BRIEF DESCRIPTION OF THE ACCOMPANYING DRAWINGS

Figure 7:
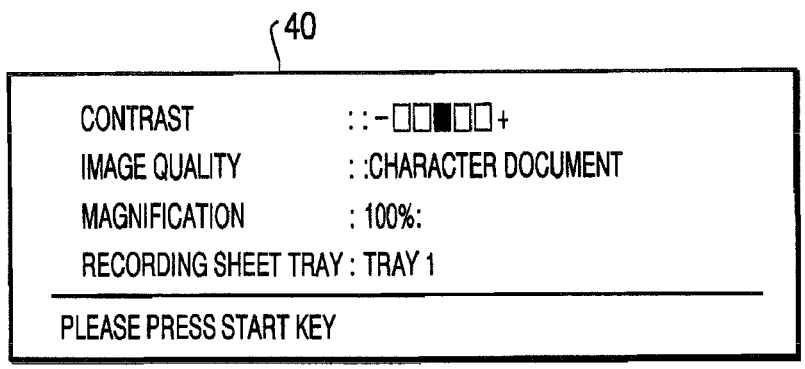

FIG. 7 exemplifies a display shown on a display unit of the MFP to accept inputs for various settings in the first embodiment according to one or more aspects of the present invention.

Figure 8:
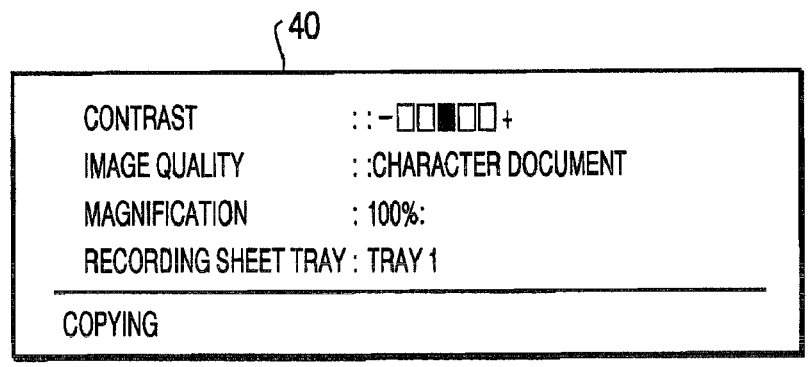

FIG. 8 exemplifies a display shown on the display unit of the MFP during a normal scanning operation in the first embodiment according to one or more aspects of the present invention.

Figure 9:
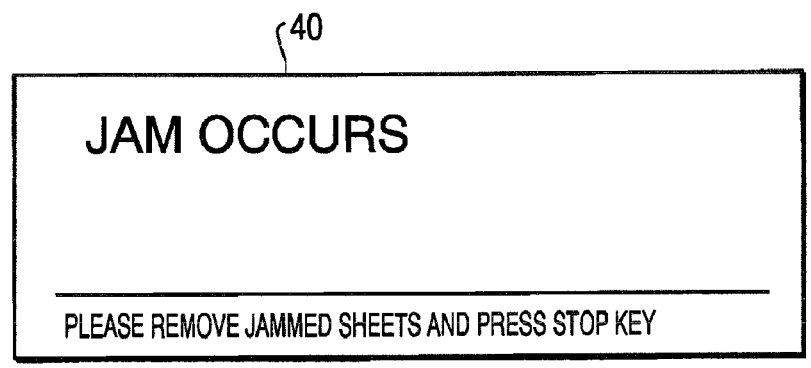

FIG. 9 exemplifies a display shown on the display unit of the MFP when a jam occurs in the first embodiment according to one or more aspects of the present invention.

FIG. 10 exemplifies a display shown on the display unit of the MFP to ask whether to resume a scanning process in the first embodiment according to one or more aspects of the present invention.

FIG. 11 exemplifies a display shown on the display unit of the MFP to accept an input of the number of "jammed sheets" in the first embodiment according to one or more aspects of the present invention.

FIG. 12 exemplifies a display shown on the display unit of the MFP to accept selection of a source for scanning the "jammed sheets" in the first embodiment according to one or more aspects of the present invention.

Figure 13:
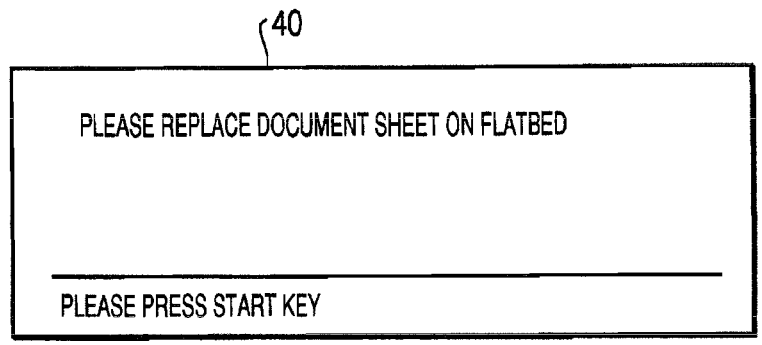

FIG. 13 exemplifies a display shown on the display unit of the MFP to induce a user to replace a document sheet on an FB glass in the first embodiment according to one or more aspects of the present invention.

Figure 14:
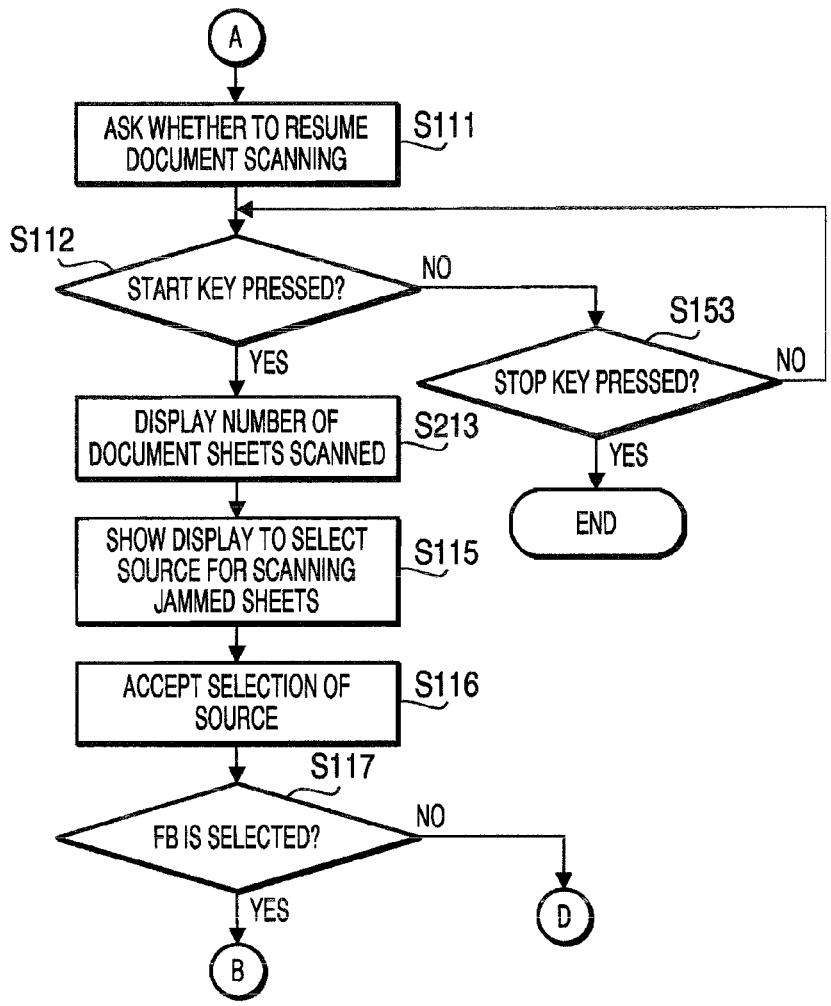
Figure 15:
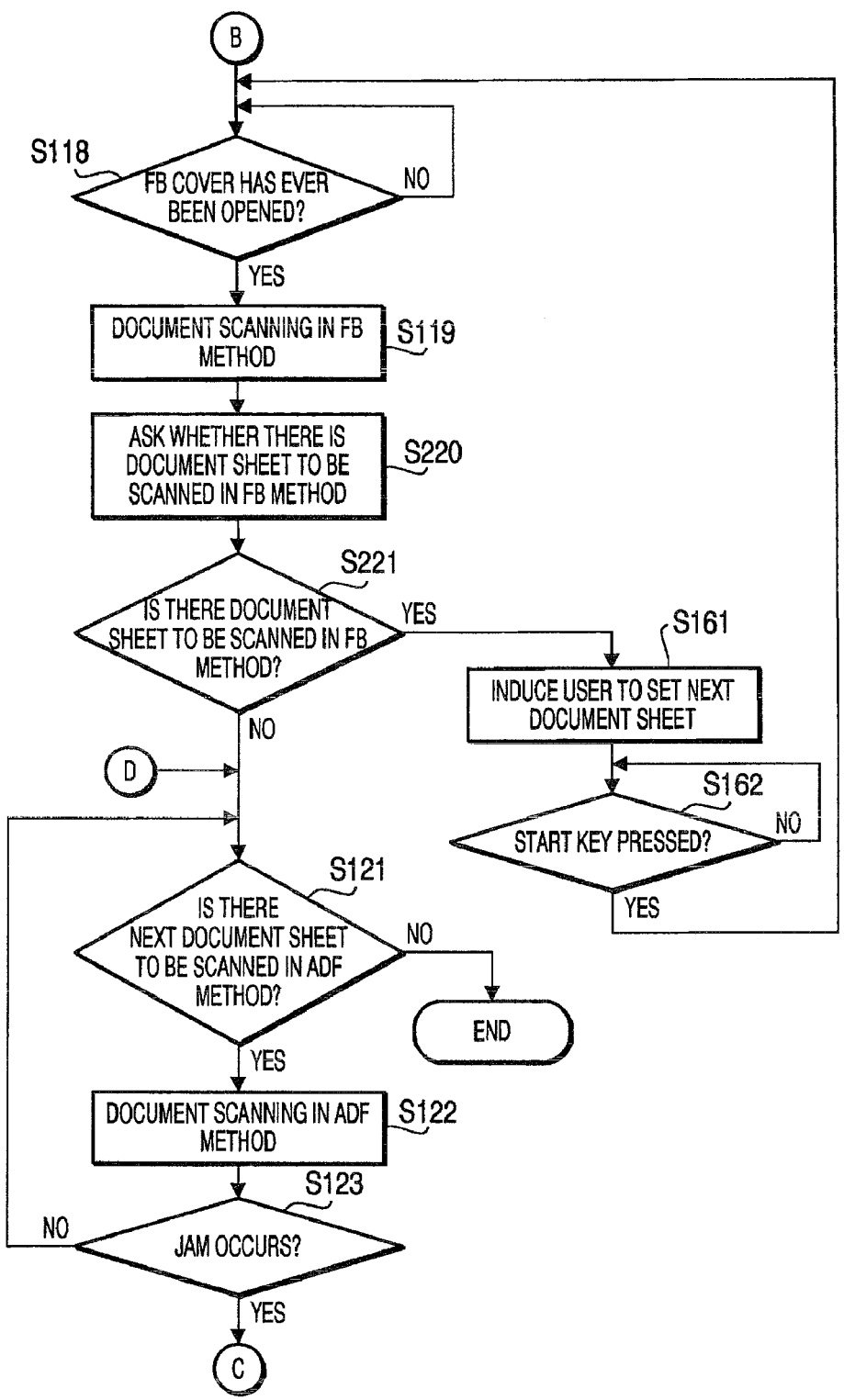

FIGS. 14 to 15 are flowcharts showing a procedure of a scanning process to be executed by the MFP in a second embodiment according to one or more aspects of the present invention.

FIG. 16 exemplifies a display shown on the display unit of the MFP to inform of document sheets already scanned in the second embodiment according to one or more aspects of the present invention.

FIG. 17 exemplifies a display shown on the display unit of the MFP to ask whether there is an FB document sheet in the second embodiment according to one or more aspects of the present invention.

Figure 18:
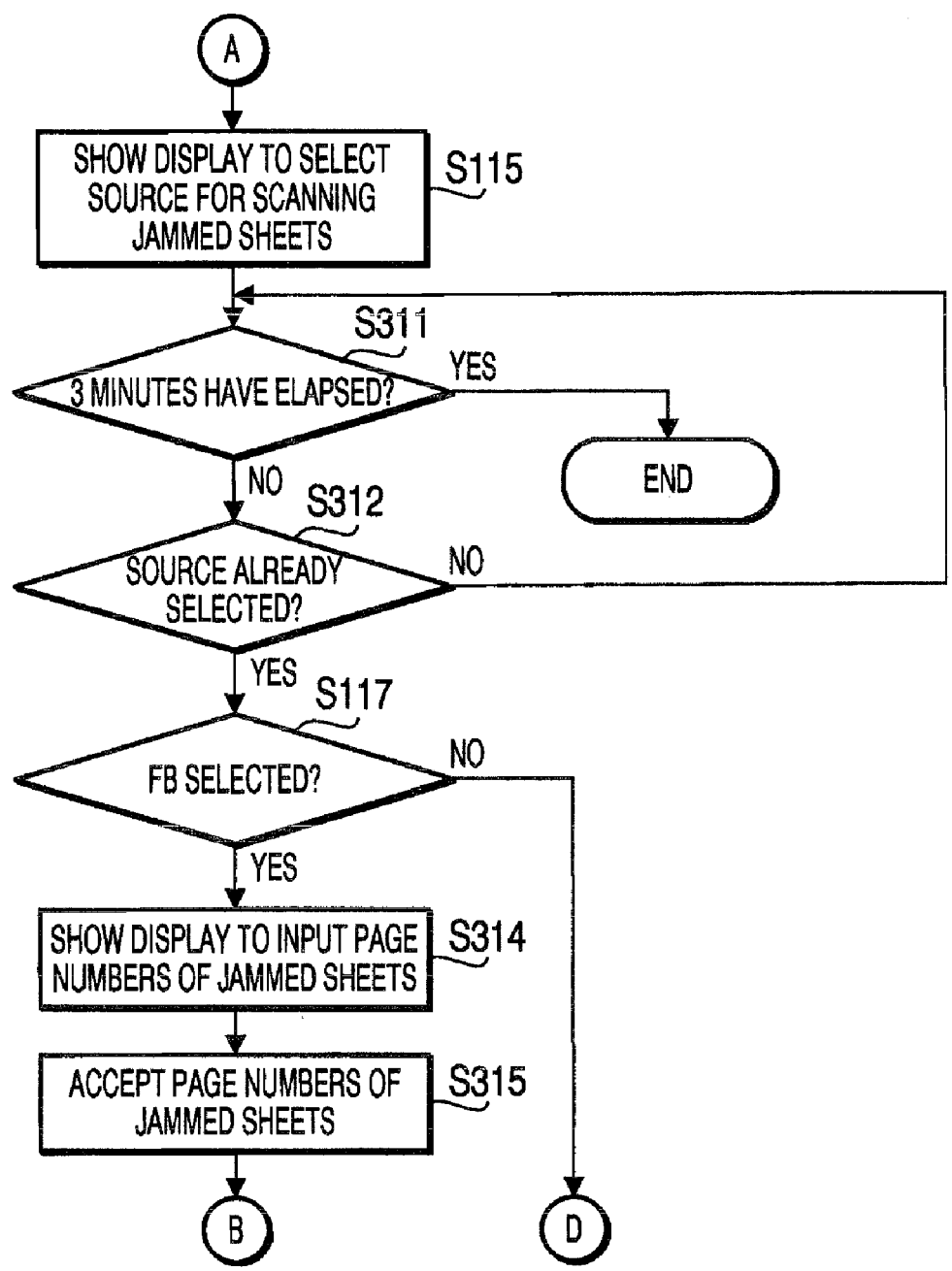
Figure 19:
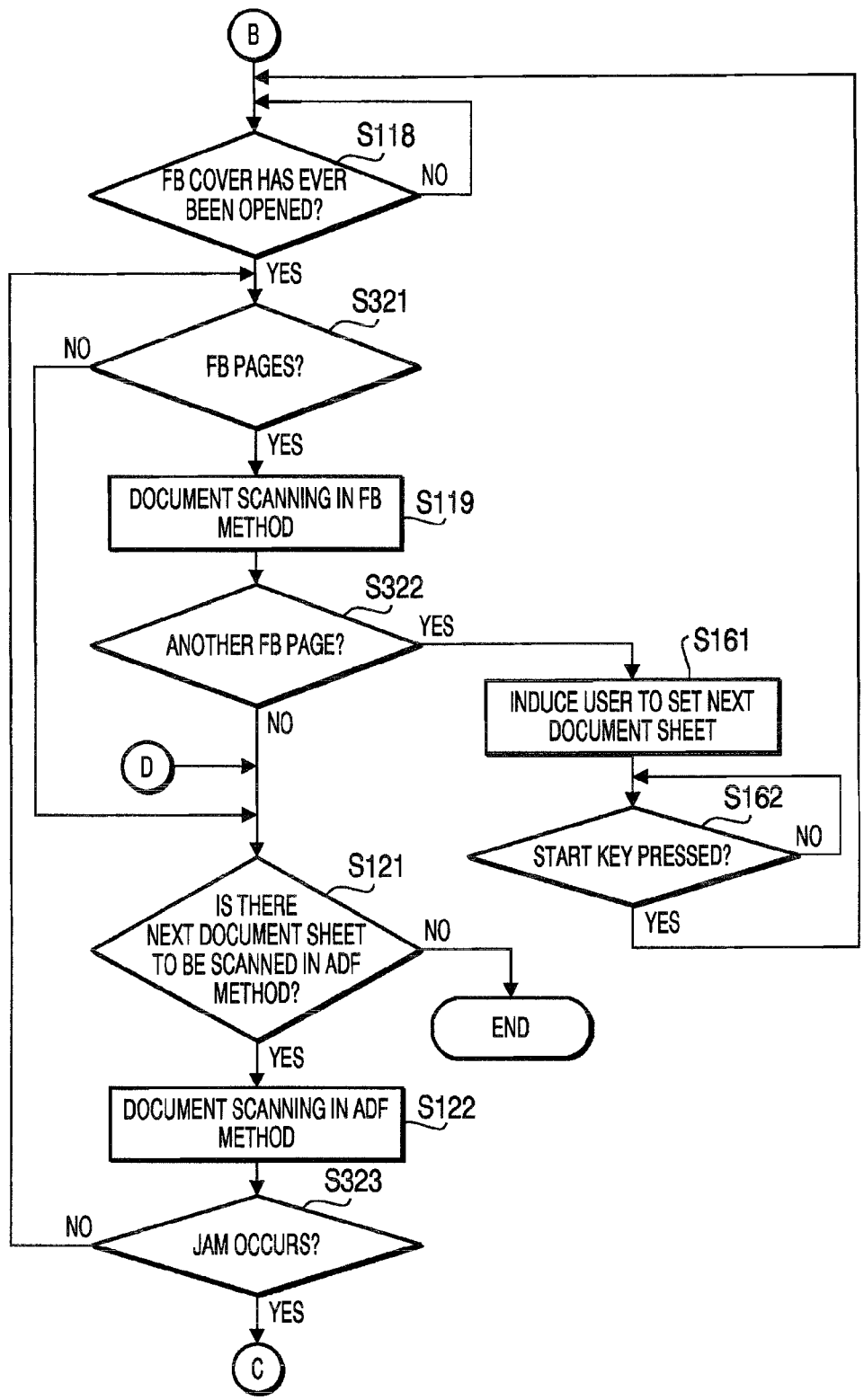

FIGS. 18 to 19 are flowcharts showing a procedure of a scanning process to be executed by the MFP in a third embodiment according to one or more aspects of the present invention.

FIG. 20 exemplifies a display shown on the display unit of the MFP to accept page numbers of the "jammed sheets" in the third embodiment according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

Hereinafter, embodiments according to aspects of the present invention will be described with reference to the accompany drawings. In the embodiments, aspects of the present invention are applied to a Multi-Function Peripheral (MFP) provided with a scanner function, a printer function, and a facsimile function.

[Configuration of MFP]

Figure 1:
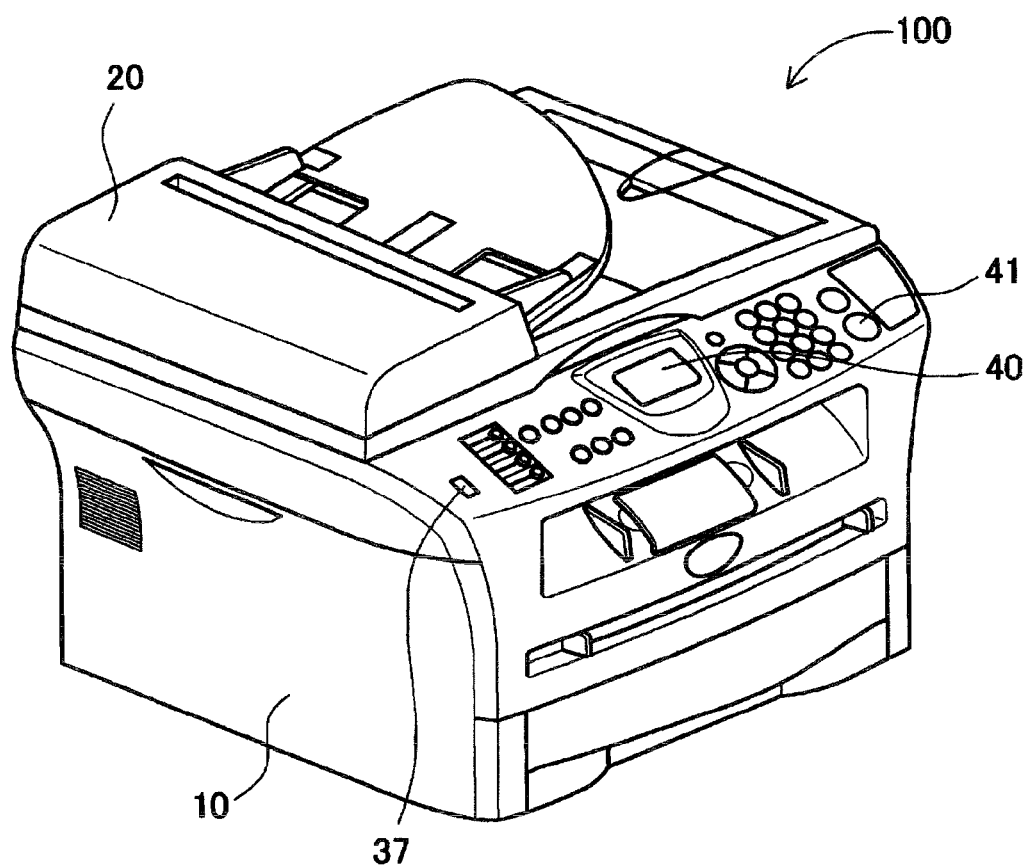
FIG. 1 is an external view of a Multi-Function Peripheral (MFP) in embodiments according to one or more aspects of the present invention.

As illustrated in FIG. 1, an MFP 100 in the embodiment includes an image forming unit 10 configured to print an image on a sheet, and an image scanning unit 20 configured to scan an image on a document sheet. It is noted that an image forming method of the image forming unit 10 may be an electrophotographic method or an inkjet method. Further, the image forming unit 10 may be configured to form a color image or designed just for monochrome image formation.

The image scanning unit 20 includes an operation panel provided at a front face side. The operation panel has a button group 41 that contains various buttons such as a start key, a stop key, a numeric keypad, a display unit 40 configured with a Liquid Crystal Display (LCD), and a USB interface 37. The button group 41 or the display unit 40 makes it possible to display an operational state or accept an input given through a user operation.

[Configuration of Scanner Unit]

Figure 2:
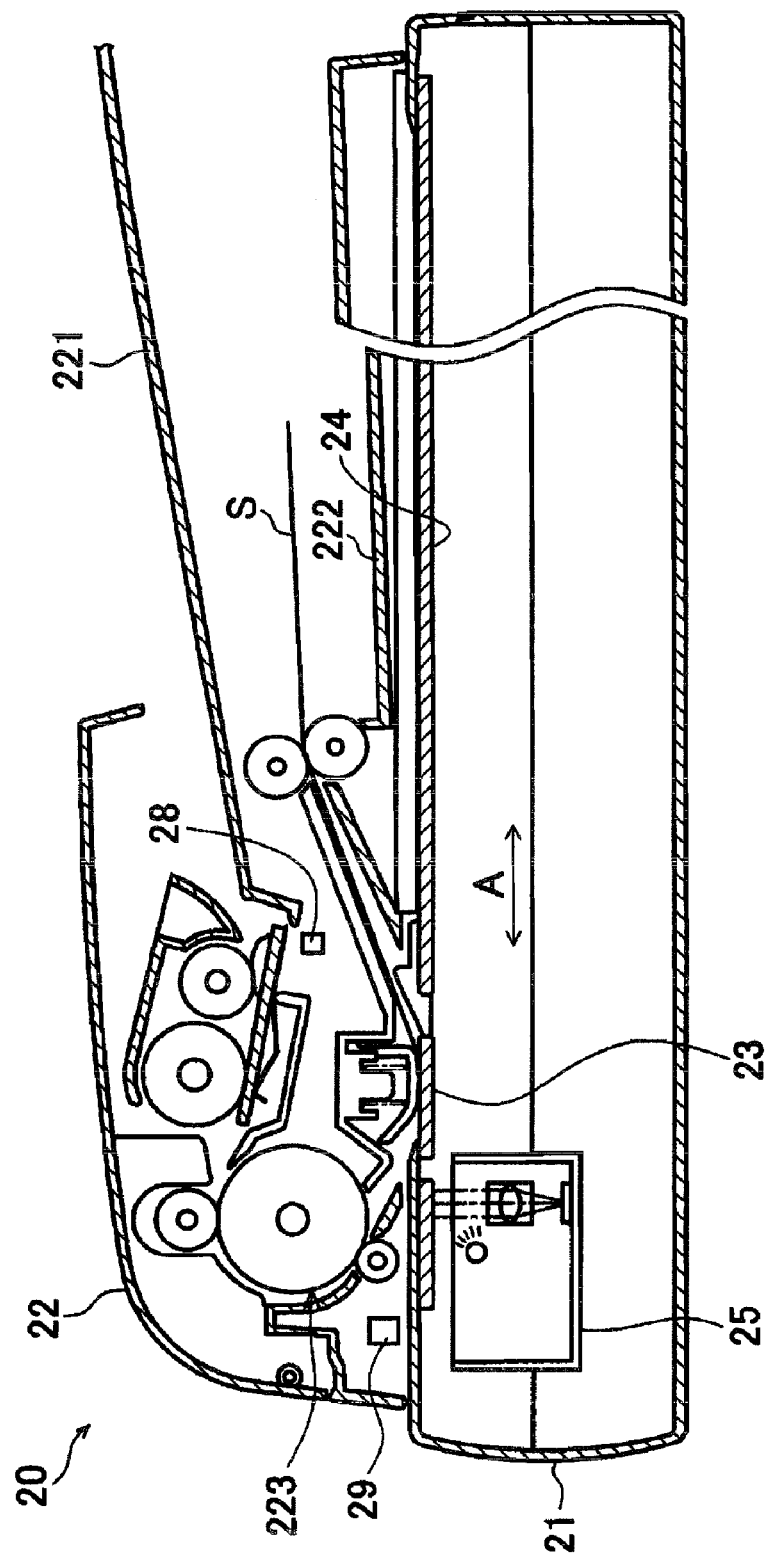
FIG. 2 is a cross-sectional view schematically showing a configuration of an image scanning unit of the MFP in the embodiments according to one or more aspects of the present invention.

As illustrated in FIG. 2, the image scanning unit 20 includes a scanner unit 21 configured to scan an image on a document sheet (for example, a document sheet S in FIG. 2), and an Automatic Document Feeder (ADF) 22 configured to automatically feed document sheets. A main body of the ADF 22 is rotatably supported by a supporter (not shown) provided at an upper end of the scanner unit 21 and doubles as a cover for covering an upper surface of the scanner unit 21. The scanner unit 21 has two transparent platen glasses 23 and 24 disposed in an upper surface thereof, and an image sensor 25 disposed therein.

The ADF 22 has a document tray 221 configured to be loaded with document sheets to be scanned, and a catch tray 222 configured to be loaded with document sheets already scanned. The document tray 221 is provided above the catch tray 222. Further, inside the ADF 22, a sheet feeding path 223 is provided to connect the document tray 221 and the catch tray 222. The ADF 22 picks up document sheets stacked on the document tray 221 on a sheet-by-sheet basis, and sequentially feeds the document sheets to a position facing the platen glass 23 (hereinafter, referred to as an "ADF glass 23." After that, the document sheets scanned are ejected onto the catch tray 222.

As methods for scanning a document sheet, a flatbed method for scanning a statically placed sheet and an ADF method for sequentially scanning sheets being conveyed are provided. In the flatbed method, document sheets to be scanned are placed on the platen glass 24 (hereinafter referred to as an "FB glass 24") on a sheet-by-sheet basis. In such as situation, the image sensor 25 scans a line of image on the document sheet in a main scanning direction while moving in an auxiliary scanning direction (a direction indicated by an arrow A in FIG. 2, which is perpendicular to the main scanning direction). Meanwhile, in the ADF method, document sheets to be scanned are stacked on the document tray 221. Then, the image sensor 25 is moved to a position facing the ADF glass 23 and set still there. In such a situation, each of the document sheets is sequentially fed to a position facing the image sensor 25 across the ADF glass 23, and an image on the document sheet is scanned on a line-by-line basis in the main scanning direction.

Further, the ADF 22 includes a document sensor 28 that is disposed around a feed-in entrance for document and configured to detect a document sheet existing at the feed-in entrance, and an open-close sensor 29 that is disposed adjacent to the supporter (not shown) for rotatably supporting the ADF 22 and configured to detect whether the ADF 22 is opened. The document sensor 28 is employed for determining whether a document sheet is placed on the document tray 221. The open-close sensor 29 is employed for determining whether the ADF 22 covers the FB glass 24.

[Electrical Configuration of MFP]

Figure 3:
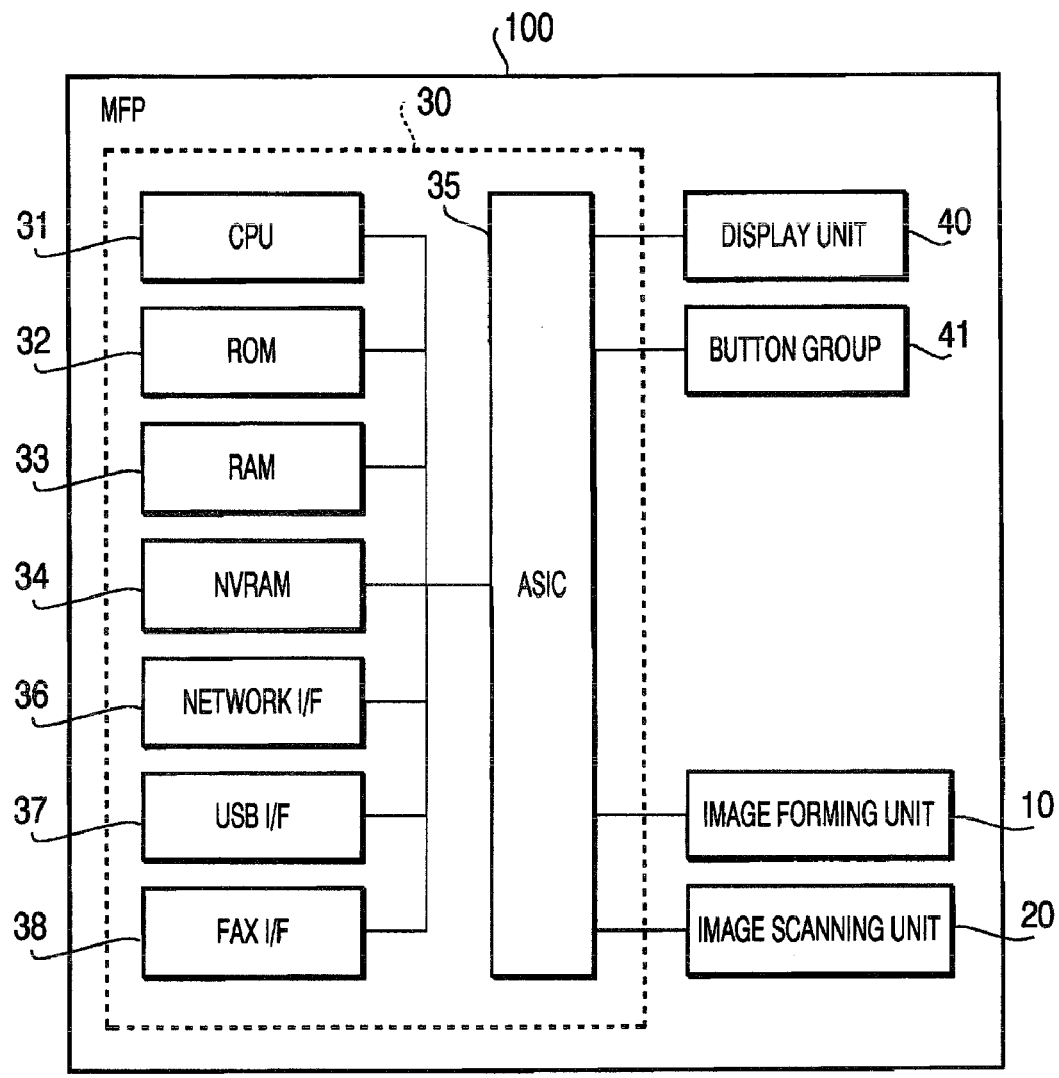
FIG. 3 is a block diagram schematically showing an electrical configuration of the MFP in the embodiments according to one or more aspects of the present invention.

Subsequently, an electrical configuration of the MFP 100 will be set forth. As shown in FIG. 3, the MFP 100 has a controller 30, which includes a CPU 31, a ROM 32, a RAM 33, an NVRAM 34, an ASIC 35, a network interface 36, a USB interface 37, and a FAX interface 38.

The ROM 32 stores various control programs for controlling the MFP 100, an image processing program, various setting values, and various initial values. The RAM 33 is employed as a work area into which the various control programs are loaded or a memory area to temporarily store image data.

The ASIC 35 is electrically linked with the image forming unit 10, the image scanning unit 20, the display unit 40, and the button group 41. For example, the ASIC 35 acquires signals for image data from the image scanning unit 20. In addition, the ASIC 35 outputs signals for forming a desired image to the image forming unit 10. Moreover, the ASIC 35 accepts signals issued through user operations of the button group 41. Furthermore, the ASIC 35 outputs signals to be displayed on the display unit 40.

The CPU 31 controls each constituent element included in the MFP 100 via the ASIC 35, in accordance with a control program read out from the ROM 32, while storing processing results for the control into the RAM 33 or the NVRAM 34. Further, the CPU 31 performs image processing for image data acquired from the image scanning unit 20, in accordance with the image processing program read out from the ROM 32.

The network interface 36 is connected with external information devices, and mutual data communication is established between the MFP 100 and the external information devices via the network interface 36. In addition, the FAX interface 38 is connected with a telephone line, and the MFP 100 can perform data communication with external facsimile machines via the FAX interface 38.

[Scanning Process by MFP]

Subsequently, explanation will be given to set forth a procedure of a scanning process for scanning an image on a document sheet when the MFP 100 performs a copy operation, in each of three embodiments.

First Embodiment

Figure 4:
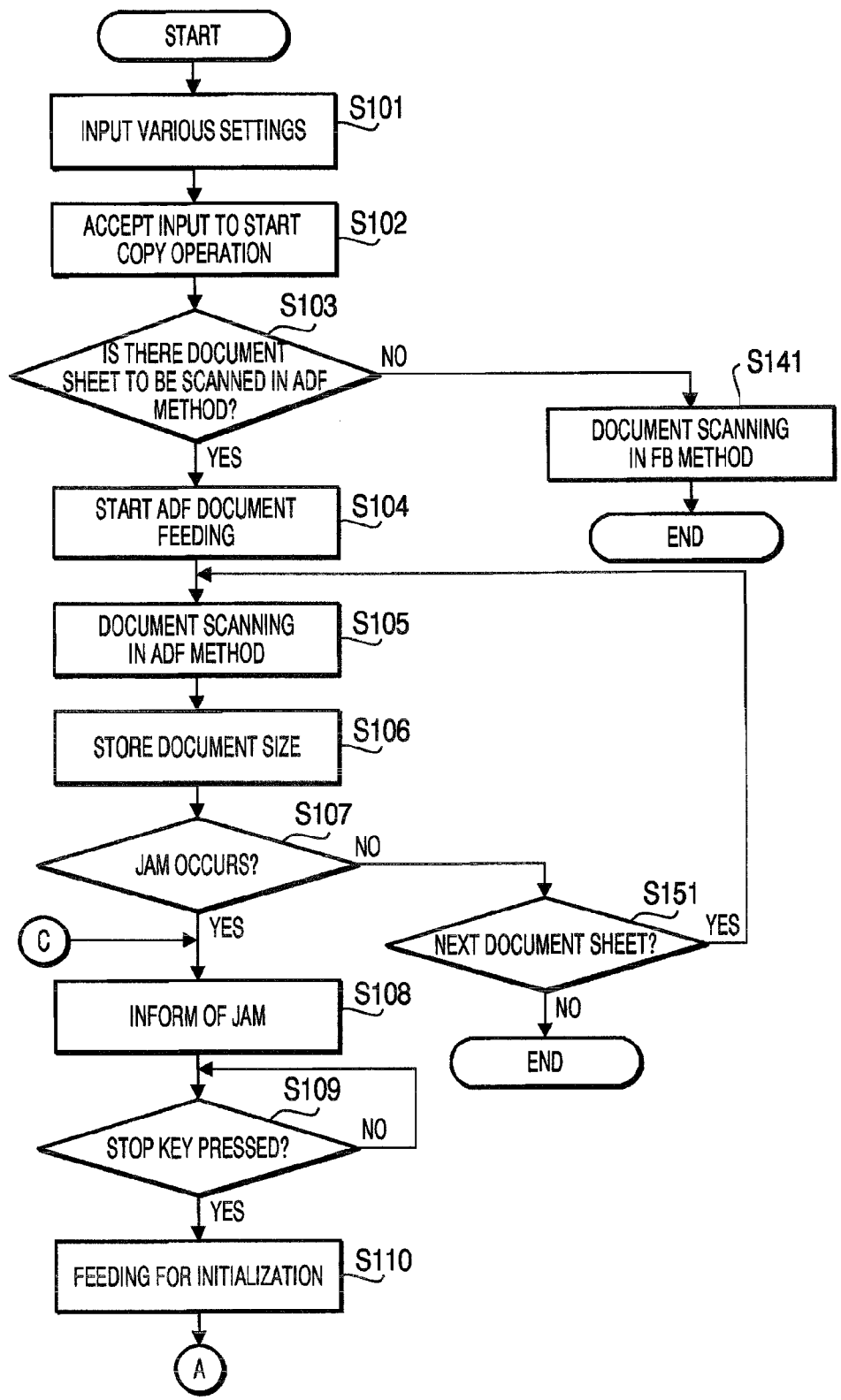
FIGS. 4 to 6 are flowcharts showing a procedure of a scanning process to be executed by the MFP in a first embodiment according to one or more aspects of the present invention.

Explanation will be given to set forth a scanning process in a first embodiment with reference to FIGS. 4 to 6.

First, the CPU 31 accepts inputs for setting the number of copies, image quality, a magnification, a feed tray, and various modes (S101). For example, as shown in FIG. 7, the display unit 40 displays setting values for the various settings. Additionally, inputs for the various settings are accepted through the button group 41. Then, an input given by pressing the start key is accepted as a trigger to start a copy operation (S102). Before pressing the start key, the user sets document sheets to be scanned on the document tray 221 of the ADF 22 when utilizing the ADF method or on the FB glass 24 when utilizing the flatbed method.

Subsequently, the CPU 31 determines whether there is a document sheet on the document tray 221 of the ADF 22 (S103), namely, whether to utilize the ADF method. The determination as to whether there is a document sheet on the document tray 221 can be made based on a signal from the document sensor. When there is no document sheet on the document tray 221 of the ADF 22 (S103: No), namely, when the flatbed method is utilized, the image sensor 25 is moved to perform document scanning (S141). After the document scanning, the present process is terminated.

Meanwhile, when there is a document sheet on the document tray 221 of the ADF 22 (S103: Yes), namely, when utilizing the ADF method, the CPU 31 launches automatic document feeding with the ADF 22 (S104). Then, document sheets are automatically fed on a sheet-by-sheet basis and scanned by the image sensor 25 (S105). Specifically, in response to the start key being pressed, the image sensor 25 is moved to a position beneath the ADF glass 23 and set static. Thereafter, the document sheets are fed onto the sheet feeding path 223 on a sheet-by-sheet basis. When each document sheet passes on the ADF glass 23, an image on the document sheet is scanned by the image sensor 25. Further, image processing is, as required, performed for the image data scanned. Additionally, the document size of the scanned document sheet is stored, for example, on the RAM 33 (S106). Moreover, as exemplified in FIG. 8, while the document sheets are normally being scanned, the CPU 31 displays on the display unit 40 a message that a copy operation (or a scanning operation) is in execution.

Subsequently, the CPU 31 determines whether a document sheet being conveyed is jammed (S107), namely, whether a jam is detected. When a jam is not caused (S107: No), it is determined whether there is a next document sheet to be scanned (S151). The determination as to whether there is a next document sheet is made based on a signal from the document sensor 28. When there is a next document sheet (S151: Yes), the CPU 31 goes back to S105 to scan an image on the next document sheet. Meanwhile, when there is no next document sheet (S151: No), the present process is terminated.

Meanwhile, when a jam is caused (S107: Yes), the CPU 31 interrupts the automatic document feeding and informs the user of the jam caused (S108). As exemplified in FIG. 9, the CPU 31 displays on the display unit 40 a message that a jam occurs. Alternatively, the CPU 31 may inform of the jam with a voice massage or a warning sound.

Subsequently, the CPU 31 waits for the stop key to be pressed by the user (S109). The user removes one or more sheets that caused the jam (hereinafter referred to as "jammed sheets") and presses the stop key. When detecting the stop key pressed (S109: Yes), the CPU 31 releases the interrupted document feeding and performs document feeding for initialization (S110), in which, specifically, document sheets left inside the ADF 22 without being scanned are ejected onto the catch tray 222.

Figure 5:
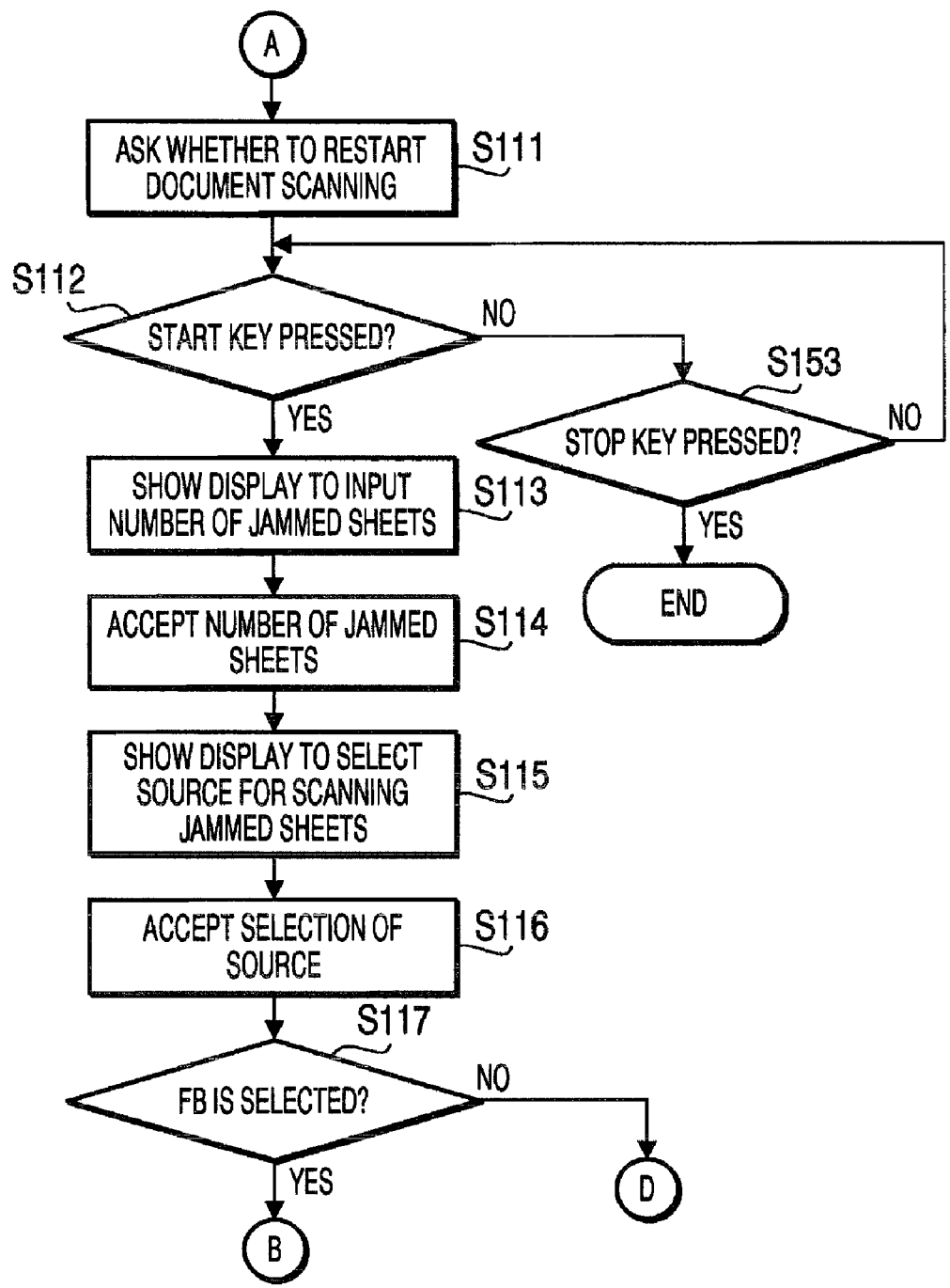
Figure 6:
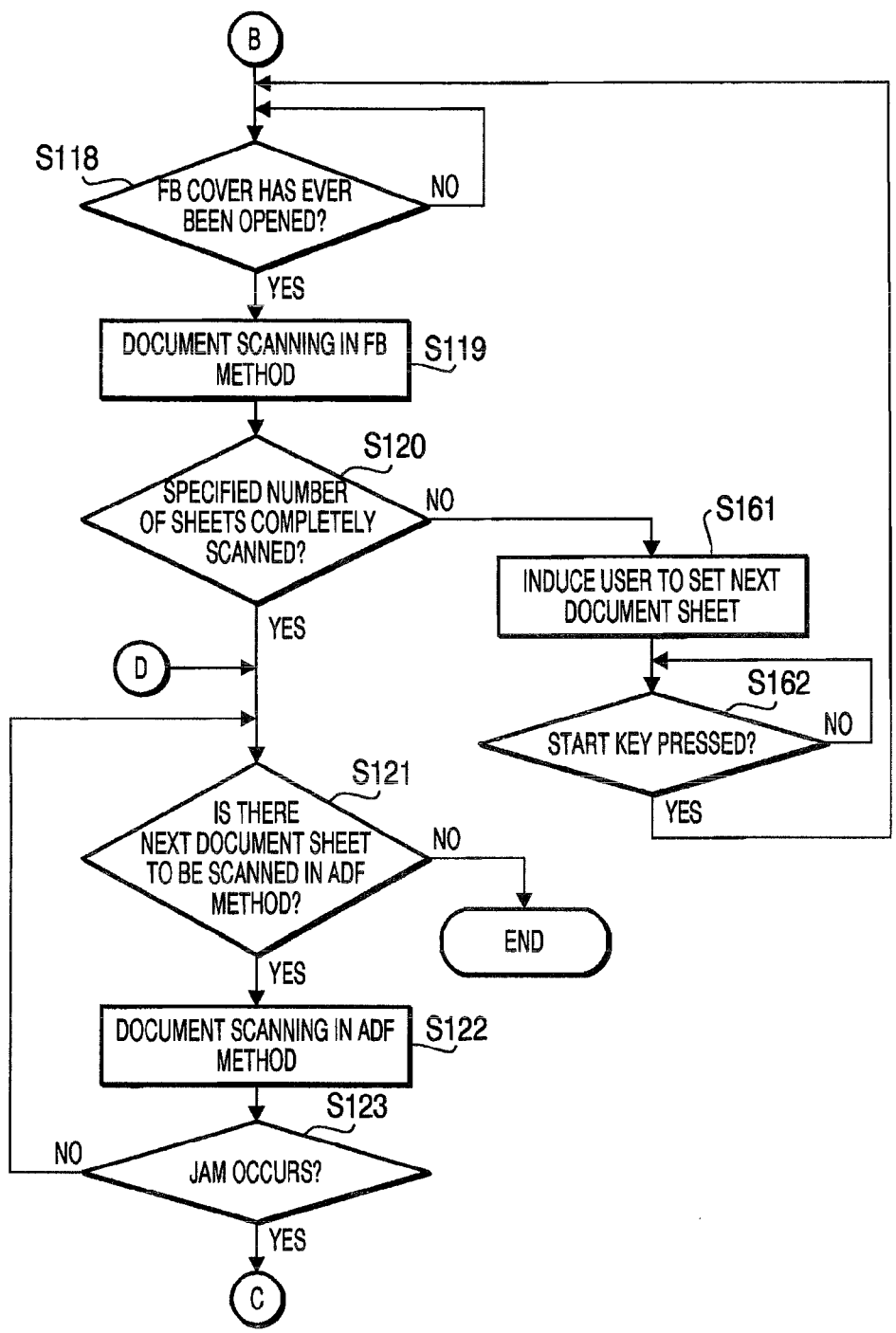

Next, the CPU 31 proceeds to S111 in a flowchart shown in FIG. 5 to ask the user whether to resume the document scanning (S111). For example, the CPU 31 displays on the display unit 40 a message as shown in FIG. 10, and sets the start key as a trigger to continue the job and the stop key as a trigger to terminate the job. Then, the CPU 31 waits for the start key to be pressed (S112) or the stop key to be pressed (S153).

When the stop key is pressed (S153: Yes), the CPU 31 terminates the present process and canceled the copy operation. Specifically, image data scanned by the time when the jam occurs is deleted from the RAM 33. Thereby, the scanning process can be reattempted from the beginning. Meanwhile, when the start key is pressed (S112: Yes), the CPU 31 advances to a damaged document mode and resumes the document scanning. Specifically, the CPU 31 proceeds to S113 to resume the document scanning.

When resuming the document scanning, the CPU 31 first asks the user about the number of the "jammed sheets" (S113). Namely, as only one sheet is not necessarily damaged in an event of jam, the number of damaged sheets is set. For example, the CPU 31 displays on the display unit 40 a message as shown in FIG. 11 and accepts an input of the number of the "jammed sheets" through the numeric keypad of the button group 41 (S114).

Subsequently, the CPU 31 asks the user about a source for scanning the "jammed sheets." Namely, the user is induced to select the scanning method for the "jammed sheets" between the ADF method and the flatbed (FB) method. When the "jammed sheets" are not so seriously damaged and in a good condition, the ADF method is a more efficient way to scan the "jammed sheets." Therefore, the CPU 31 causes the user to select the source (the scanning method) for the "jammed sheets." For example, the CPU 31 displays on the display unit 40 a message as shown in FIG. 12, and accepts a selection through a button "▲" or "▼" of the button group 41 and an input for setting the selection through the start key (S116). It is noted that any of the setting of the number of the "jammed sheets" (S113 and S114) and the selection of the scanning method for the "jammed sheets" (S115 and S116) may be executed ahead of the other.

In addition, as illustrated in FIG. 12, a message is displayed on a source selection screen, recommending the user to select the flatbed method when the document sheets to be scanned are damaged. This is because "jammed sheets" damaged is highly likely to cause a jam again. Hence, such a message is displayed so as to induce the user to voluntarily select the FB method.

Next, the CPU 31 determines whether the FB method is selected (S117). When the FB method is selected (S117: Yes), the CPU 31 advances to S118 in a flowchart shown in FIG. 6 to perform document scanning in the FB method. In the scanning process, when the FB method is selected, document sheets to be scanned immediately after the document feeding is resumed are regarded as "damaged sheets." Namely, any special operation is not required for determining the "damaged sheets." Meanwhile, when the FB method is not selected (S117: No), without performing the document scanning in the FB method, the CPU 31 advances to S121 is the flowchart shown in FIG. 6 to perform the document scanning in the ADF method.

Specifically, in the document scanning in the FB method, the CPU 31 first determines whether an FB cover (i.e., a main body of the ADF 22) has ever been opened (S118). When the FB cover has ever been opened, the CPU 31 determines that the sheets are set on the FB glass 24. The determination as to whether the FB cover has ever been opened is made based on a signal from the open-close sensor 29, and an open flag is set on at the time when opening the FB cover is detected. The CPU 31 determines, based on a value of the open flag, whether the FB cover has ever been opened. When the FB cover has never been opened (S118: No), the CPU 31 waits the FB cover to be opened.

When the FB cover has ever been opened (S118: Yes), after detecting that the FB cover is closed, the "jammed sheet" placed on the FB glass 24 is scanned with the image sensor 25 (S119). In the document scanning, a document size, which represents a scanned area on the FB glass 24, is set to the same size as the document size scanned in the ADF method before the jam occurs if the scanned size remains stored (S106 in FIG. 4). Thereby, the document size of the "jammed sheet" determined in the document scanning in the ADF method is identical to that determined in the document scanning in the FB method. After scanning the "jammed sheet," the open flag for the FB cover is reset.

Subsequently, the CPU 31 determines whether the "jammed sheets" of the number specified in S113 are completely scanned (S120). When the specified number of "jammed sheets" are not completely scanned (S120: No), the CPU 31 displays on the display unit 40 an instruction to set a next sheet on the FB glass 24 (S161). For example, the CPU 31 displays on the display unit 40 a message as shown in FIG. 13 and sets the start key as a trigger to restart the document scanning in the FB method. Then, the CPU 31 waits for the start key to be pressed (S162). When the start key is pressed (S162: Yes), the CPU 31 goes back to S118 to determine that the FB cover has ever been opened, and thereafter performs the document scanning in the FB method.

Meanwhile, when the specified number of "jammed sheets" are completely scanned (S120: Yes), the CPU 31 advances to S121 to continue the document scanning in the ADF method. Specifically, in the document scanning in the ADF method, the CPU 31 first determines whether there is a next document sheet to be scanned (S121), namely, whether a document sheet remains on the document tray 221. When there is no next document sheet (S121: No), the present process is terminated. Meanwhile, when there is a next document sheet (S121: Yes), an image on the document sheet is scanned (S122). Then, the CPU 31 determines whether the document sheet being conveyed is jammed (S123). When a jam is not caused (S123: No), the CPU 31 goes back to S121 to repeat the document scanning for the remaining sheets. Meanwhile, when a jam is caused (S123: Yes), the CPU 31 goes back to S108 in FIG. 4 to repeat the steps to be executed when a jam occurs.

After the aforementioned scanning process, the CPU 31 advances to an image forming process to form an image on a sheet based on the image data scanned or image data resulting from the image processing. It is noted that explanation of the image forming process, which is the same as a known process, will be omitted.

Second Embodiment

Subsequently, a scanning process in a second embodiment will be set forth with reference to FIGS. 14 and 15. The second embodiment provides explanation of a scanning process in the case of double-side scanning. It is noted that, in flowcharts, the same steps as those in the first embodiment are provided with the same step numbers. Additionally, since the operations of the start to the step S112 to accept the instruction to resume the document scanning are common between the first and second embodiments, explanation of the common operations will be omitted in the following description.

In the second embodiment, as illustrated in FIG. 14, when resuming the document scanning in the damaged document mode, the number of sheets already scanned before a jam occurs is displayed (S213). It is noted that, at this time, alternatively or optionally, the page number of a sheet that has caused the jam may be displayed. For instance, the CPU 31 displays on the display unit 40 a message as shown in FIG. 16 to clarify whether the first side of the last scanned sheet has been scanned.

Subsequently, the CPU 31 asks the user about the source for scanning the "jammed sheets" (S116). Then, it is determined whether the FB method is selected (S117). When the FB method is selected (S117: Yes), the CPU 31 advances to S118 in a flowchart shown in FIG. 15 to perform the document scanning in the FB method. Meanwhile, when the FB method is not selected (S117: No), without performing the document scanning in the FB method, the CPU 31 proceeds to S121 in FIG. 15 to perform the document scanning in the ADF method.

Specifically, in the document scanning in the FB method, the CPU 31 first determines whether the FB cover has ever been opened (S118). When the FB cover has never been opened (S118: No), the CPU 31 waits the FB cover to be opened. When the FB cover has ever been opened (S118: Yes), after detecting that the FB cover is closed, the "jammed sheet" placed on the FB glass 24 is scanned with the image sensor 25 (S119).

Subsequently, the CPU 31 asks the user whether there is a document sheet to be scanned in the FB method (S220). For example, the CPU 31 displays on the display unit 40 a message as shown in FIG. 17 and sets the start key as a trigger to issue an instruction that there is a document sheet to be scanned and the stop key as a trigger to issue an instruction that there is no document sheet to be scanned. In the double-side scanning, when the first side of the document sheet has not yet been scanned, two times of scanning operations for the first and second sides of the document sheet are required. Meanwhile, when the first side of the document sheet has already been scanned, only the second side of the document sheet has to be scanned. Thus, the CPU 31 inquires the user whether to repeat the document scanning in the FB method. Thereby, even though a jam occurs while any side of the document sheet is being scanned, it is possible to resume the document scanning from an appropriate side of the document sheet.

When the instruction that there is a document sheet to be scanned is issued (S221: Yes), the CPU 31 displays on the display unit 40 an instruction to induce the user to set a next document sheet (S161). Then, the CPU 31 waits the start key to be pressed (S162). When the start key is pressed (S162: Yes), the CPU 31 goes back to S118 to perform the document scanning in the FB method after determining that the FB cover has ever been opened. For example, when any of the both sides of the document sheet has not yet been scanned, the inquiry in S220 is made after scanning the first side. Then, after issuing the instruction that there is a document sheet to be scanned, the user reverses the document sheet on the FB glass 24 and has the second side thereof scanned.

Meanwhile, when the instruction that there is no document sheet to be scanned is issued (S221: No), the CPU 31 proceeds to S121 to continuously perform the document scanning in the ADF method. For instance, when only the second side of the document sheet has to be scanned, after the second side is scanned in S119, the user issues the instruction that there is no document sheet to be scanned, in response to the inquiry in S220. Thereby, the next document sheet is scanned with the ADF 22. As a scanning procedure in the ADF method in S121 and the following steps is the same as that in the first embodiment, explanation of the scanning procedure will be omitted.

Third Embodiment

Subsequently, a scanning process in a third embodiment will be described with reference to FIGS. 18 and 19. In the third embodiment, when a jam occurs, image data scanned by the time is deleted, and the document scanning is resumed to scan all the document sheets. It is noted that, in flowcharts, the same steps as those in the first embodiment are provided with the same step numbers. Additionally, since the operations of the start to the step S110 for the document feeding for initialization are common between the first and third embodiments, explanation of the common operations will be omitted in the following description.

In the third embodiment, as illustrated in FIG. 18, after the document feeding for initialization, the CPU 31 asks the user about the source for scanning the "jammed sheets" (S115). Then, the CPU 31 determines whether a time period of three minutes has elapsed after beginning to display the source selection screen (S311). Namely, when the user gets away from the MFP 100 prior to issuing the instruction to resume the document scanning, it is impossible to resume the document scanning. In such a situation, a next user cannot utilize the MFP 100. Thus, a predetermined timeout period (in the third embodiment, three minutes) is set. Time measurement is started in response to the interruption of the document feeding being released. When the timeout period of three minutes has elapsed (S311: Yes), the present process is forcibly terminated. Thereby, it is possible to prevent one user from occupying the MFP 100 for a long time.

When the timeout period of three minutes has not elapsed (S311: No), the CPU 31 determines whether the source for scanning the "jammed sheet" is selected (S312), namely, whether the user selects the source and presses the start key. When the source is not selected (S312: No), the CPU 31 goes back to S311 and there waits until the source is selected or until the timeout period has elapsed. Meanwhile, when the source is selected (S312: Yes), the CPU 31 advances to a damaged document mode in S17 and the following steps.

In the damaged document mode, the CPU 31 first determines whether the FB method is selected (S117). When the FB method is selected (S117: Yes), the CPU 31 proceeds to S314 to perform the document scanning in the FB method. Meanwhile, when the FB method is not selected (S117: No), without performing the document scanning in the FB method, the CPU 31 advances to S121 in a flowchart shown in FIG. 19 to perform the document scanning in the ADF method.

In the document scanning in the FB method, the CPU 31 asks the user about page numbers of the "jammed sheets" (S314). In the scanning process of the third embodiment, unlike the precedent embodiments in which document sheets to be scanned immediately after the document feeding is resumed are regarded as the "damaged sheets," document sheets identified with page numbers specified by the user are regarded as the "damaged sheets." For example, the CPU 31 displays on the display unit 40 a message as shown in FIG. 20 to induce the user to input page numbers of the "jammed sheets." Then, the CPU 31 accepts the input of one or more page numbers (S315). Here, only one page number may be input, or a plurality of page numbers may be input with each page number separated with a comma. The page numbers input are stored on the RAM 33 as page numbers of document sheets to be scanned in the FB method (FB pages).

Subsequently, the CPU 31 advances to S118 in the flowchart shown in FIG. 19 to determine whether the FB cover has ever been opened (S118). When the FB cover has never been opened (S118: No), the CPU 31 waits for the FB cover to be opened. Meanwhile, when the FB cover has ever been opened (S118: Yes), the CPU 31 determines whether page numbers of the document sheets to be scanned are the FB pages (S321). When the page numbers of the document sheets to be scanned are not the FB pages (S321: No), without performing the document scanning in the FB method, the CPU 31 advances to S121.

Meanwhile, when the page numbers of the document sheets to be scanned are the FB pages (S321: Yes), the "jammed sheets" placed on the FB glass 24 are scanned (S119). Thereafter, the CPU 31 determines whether there is another FB page (S322). When there is another FB page (S322: Yes), an instruction to set a next document sheet is displayed (S161). Then, the CPU 31 waits for the start key to be pressed (S162). When the start key is pressed (S162: Yes), the CPU 31 goes back to S118 to determine that the FB cover has ever been opened, and thereafter resumes the document scanning in the FB method.

On the other hand, in the document scanning in the ADF method, the CPU 31 first determines whether there is a next document sheet (S121), namely, whether a document sheet remains on the document tray 221. When there is no next document sheet (S121: No), the present process is terminated. When there is a next document sheet (S121: Yes), the next document sheet is scanned (S122). Then, the CPU 31 determines whether the sheet being conveyed is jammed (S323). When a jam is not caused (S323: No), the CPU 31 goes back to S321 to repeat the document scanning for remaining document sheets. When a jam is caused (S323: Yes), the CPU 31 goes back to S108 (see FIG. 4) to repeat the steps to be executed when a jam occurs.

As described in detail above, according to the MFP 100 in the first and second embodiments, when the automatic document feeding by the ADF 22 is interrupted due to a jam, document sheets to be scanned immediately after the document feeding is resumed are regarded as the "damaged sheets." Further, in the third embodiment, document sheets identified with page numbers specified by the user are regarded as the "damaged sheets." Additionally, in the damaged document mode, document sheets regarded as the "damaged sheets" are scanned in the FB method, whereas document sheets regarded as not the "damaged sheets" are scanned in the ADF method. In other words, the "damaged sheets" are not fed into the ADF 22. Thereby, it is possible to prevent the "jammed sheets" from being again damaged. In addition, since document sheets other than the "damaged sheets" are scanned by the ADF 22, so much effort is not required for scanning them.

Furthermore, when the document feeding is resumed, the total number or the page numbers of the "damaged sheets" are set, and document sheets identified with the total number or the page numbers as set are scanned in the FB method. Hence, even though plural document sheets are damaged, the plural document sheets are identified as the "damaged sheets" with the total number or the page numbers and appropriately scanned.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein. For example, the following modifications are possible.

In the aforementioned embodiments, aspects of the present invention are applied to an MFP. However, aspects of the present invention may be applied to any apparatus provided with an image scanning function such as a copy machine, a scanner, and a facsimile machine.

In the aforementioned embodiments, the number of the "jammed sheets" is input manually by the user. However, the number of the "jammed sheets" may automatically be determined. For example, plural sensors may be provided on the sheet feeding path 223 of the ADF 22 to acquire the number of sheets left on the sheet feeding path 223 due to a jam caused and then automatically determine the acquired number as the number of the "jammed sheets."

What is claimed is:

1. An image scanner comprising:
a feeding unit configured to perform document feeding to sequentially feed sheets;
a flatbed glass configured to be loaded with a sheet thereon;
a scanning unit configured to perform document scanning in any one of a first mode and a second mode, the first mode being a method for sequentially scanning sheets being fed by the feeding unit, the second mode being a method for scanning each sheet which is placed on the flatbed glass on a sheet-by-sheet basis;
an interrupting unit configured to detect an error during the document feeding with the feeding unit and to interrupt the document feeding;
an identifying unit configured to identify one or more damaged sheets among document sheets to be scanned;
a controller configured to, after the interrupted document feeding is released with the detected error being settled, control the scanning unit to perform the document scanning in the second mode for the damaged sheets identified by the identifying unit and in the first mode for undamaged sheets other than the damaged sheets among the document sheets to be scanned; and
a resuming unit configured to accept an instruction to resume the document scanning after the interrupted document feeding is released,
wherein, when the resuming unit accepts the instruction to resume the document scanning within a predetermined time period after the interrupted document feeding is released, the controller causes the scanning unit to perform the document scanning for the document sheets to be scanned, and
wherein, unless the resuming unit accepts the instruction to resume the document scanning within a predetermined time period after the interrupted document feeding is released, the controller cancels the document scanning to be performed for the document sheets to be scanned.

2. The image scanner according to claim 1,
wherein the identifying unit is configured to identify, as the damaged sheets, one or more sheets to be scanned immediately after the interrupted document feeding is released.

3. The image scanner according to claim 1, further comprising an informing unit configured to, after the interrupted document feeding is released, give information that the damaged sheets are to be scanned in the second mode.

4. The image scanner according to claim 1, further comprising a notifying unit configured to, after the interrupted document feeding is released, give notice of at least one of a total number of sheets completely scanned and a page number of a sheet that has caused the error.

5. The image scanner according to claim 4,
wherein the notifying unit is configured to give notice of which side of the sheet that has caused the error in execution of double-side scanning is to be scanned.

6. The image scanner according to claim 1, further comprising a storage configured to store a size of sheets fed by the feeding unit,
wherein the scanning unit is configured to, when a size of the damaged sheets remains stored on the storage, scan the damaged sheets in the second mode in accordance with the size of the damaged sheets stored on the storage.

7. The image scanner according to claim 1, further comprising a releasing unit configured to release the document feeding interrupted by the interrupting unit after the detected error is settled.

8. An image scanner comprising:
a feeding unit configured to perform document feeding to sequentially feed sheets;
a flatbed glass configured to be loaded with a sheet thereon;
a scanning unit configured to perform document scanning in any one of a first mode and a second mode, the first mode being a method for sequentially scanning sheets being fed by the feeding unit, the second mode being a method for scanning each sheet which is placed on the flatbed glass on a sheet-by-sheet basis;
an interrupting unit configured to detect an error during the document feeding with the feeding unit and to interrupt the document feeding;
an identifying unit configured to identify one or more damaged sheets among document sheets to be scanned;
a controller configured to, after the interrupted document feeding is released with the detected error being settled, control the scanning unit to perform the document scanning in the second mode for the damaged sheets identified by the identifying unit and in the first mode for undamaged sheets other than the damaged sheets among the document sheets to be scanned; and
a total number acquiring unit configured to acquire a total number of the damaged sheets,
wherein the identifying unit is configured to identify, as the damaged sheets, sheets of the total number acquired by the total number acquiring unit from a sheet to be scanned immediately after the interrupted document feeding is released.

9. An image scanner comprising:
a feeding unit configured to perform document feeding to sequentially feed sheets;
a flatbed glass configured to be loaded with a sheet thereon;
a scanning unit configured to perform document scanning in any one of a first mode and a second mode, the first mode being a method for sequentially scanning sheets being fed by the feeding unit, the second mode being a method for scanning each sheet which is placed on the flatbed glass on a sheet-by-sheet basis;
an interrupting unit configured to detect an error during the document feeding with the feeding unit and to interrupt the document feeding;
an identifying unit configured to identify one or more damaged sheets among document sheets to be scanned;
a controller configured to, after the interrupted document feeding is released with the detected error being settled, control the scanning unit to perform the document scanning in the second mode for the damaged sheets identified by the identifying unit and in the first mode for undamaged sheets other than the damaged sheets among the document sheets to be scanned; and
a page number acquiring unit configured to acquire page numbers of the damaged sheets,
wherein the identifying unit is configured to identify, as the damaged sheets, sheets specified with the page numbers acquired by the page number acquiring unit among the document sheets to be scanned.

10. A method for performing document scanning with an image scanner that has a feeding unit configured to sequentially feed sheets and a flatbed glass configured to be loaded with a sheet thereon, the method comprising:
a feeding step of performing document feeding with the feeding unit;
an interrupting step of detecting an error during the document feeding with the feeding unit and interrupting the document feeding;
a releasing step of releasing the document feeding interrupted in the interrupting step after the detected error is settled;
an identifying step of identifying one or more damaged sheets among document sheets to be scanned;
a scanning step of performing the document scanning in a first mode for undamaged sheets other than the damaged sheets among the document sheets to be scanned and in a second mode for the damaged sheets identified in the identifying step, the first mode being a method for sequentially scanning sheets being fed by the feeding unit, the second mode being a method for scanning each sheet which is placed on the flatbed glass on a sheet-by-sheet basis; and
a resuming step of accepting an instruction to resume the document scanning after the interrupted document feeding is released,
wherein, when the instruction to resume the document scanning is accepted in the resuming step within a predetermined time period after the interrupted document feeding is released, the scanning step is performed, and
wherein, unless the resuming unit accepts the instruction to resume the document scanning within a predetermined time period after the interrupted document feeding is released, the scanning step is canceled.

11. The method according to claim 10,
wherein the identifying step is adapted to identify, as the damaged sheets, one or more sheets to be scanned immediately after the interrupted document feeding is released.

12. The method according to claim 10, further comprising an informing step of, after the interrupted document feeding is released, giving information that the damaged sheets are to be scanned in the second mode.

13. The method according to claim 10, further comprising a notifying step of, after the interrupted document feeding is released, giving notice of at least one of a total number of sheets completely scanned and a page number of a sheet that has caused the error.

14. The method according to claim 13, wherein the notifying step is adapted to give notice of which side of the sheet that has caused the error in execution of double-side scanning is to be scanned.

15. The method according to claim 10, further comprising a storing step of configured to store a size of sheets fed by the feeding unit,
wherein the scanning step is adapted to, when a size of the damaged sheets remains stored on a storage of the image scanner, scan the damaged sheets in the second mode in accordance with the size of the damaged sheets stored on the storage.

16. A method for performing document scanning with an image scanner that has a feeding configured to sequentially feed sheets and a flatbed glass configured to be loaded with a sheet thereon, the method comprising:
a feeding step of performing document feeding with the feeding unit;
an interrupting step of detecting an error during the document feeding with the feeding unit and interrupting the document feeding;
a releasing step of releasing the document feeding interrupted in the interrupting step after the detected error is settled;
an identifying step of identifying one or more damaged sheets among document sheets to be scanned;
a scanning step of performing the document scanning in a first mode for undamaged sheets other than the damaged sheets among the document sheets to be scanned and in a second mode for the damaged sheets identified in the identifying step, the first mode being a method for sequentially scanning sheets being fed by the feeding unit, the second mode being a method for scanning each sheet which is placed on the flatbed glass on a sheet-by-sheet basis; and
a total number acquiring step of acquiring a total number of the damaged sheets,
wherein the identifying step is adapted to identify, as the damaged sheets, sheets of the total number acquired in the total number acquiring step from a sheet to be scanned immediately after the interrupted document feeding is released.

17. A method for performing document scanning with an image scanner that has a feeding unit configured to sequentially feed sheets and a flatbed glass configured to be loaded with a sheet thereon, the method comprising:
a feeding step of performing document feeding with the feeding unit;
an interrupting step of detecting an error during the document feeding with the feeding unit and interrupting the document feeding;
a releasing step of releasing the document feeding interrupted in the interrupting step after the detected error is settled;
an identifying step of identifying one or more damaged sheets among document sheets to be scanned;
a scanning step of performing the document scanning in a first mode for undamaged sheets other than the damaged sheets among the document sheets to be scanned and in a second mode for the damaged sheets identified in the identifying step, the first mode being a method for sequentially scanning sheets being fed by the feeding unit, the second mode being a method for scanning each sheet which is placed on the flatbed glass on a sheet-by-sheet basis; and
a page number acquiring step of acquiring page numbers of the damaged sheets,
wherein the identifying step is adapted to identify, as the damaged sheets, sheets specified with the page numbers acquired in the page number acquiring step among the document sheets to be scanned.

18. A non-transitory computer readable medium having computer readable instructions stored thereon, the instructions causing an image scanner, which has a feeding unit configured to sequentially feed sheets and a flatbed glass configured to be loaded with a sheet thereon, to perform:
a feeding step of performing document feeding with the feeding unit;
an interrupting step of detecting an error during the document feeding and interrupting the document feeding;
a releasing step of releasing the document feeding interrupted in the interrupting step after the detected error is settled;
an identifying step of identifying one or more damaged sheets among document sheets to be scanned;
a scanning step of performing the document scanning in a first mode for undamaged sheets other than the damaged sheets among the document sheets to be scanned and in a second mode for the damaged sheets identified in the identifying step, the first mode being a method for sequentially scanning sheets being fed by the feeding unit, the second mode being a method for scanning each sheet which is placed on the flatbed glass on a sheet-by-sheet basis; and
a resuming step of accepting an instruction to resume the document scanning after the interrupted document feeding is released,
wherein, when the instruction to resume the document scanning is accepted in the resuming step within a predetermined time period after the interrupted document feeding is released, the scanning step is performed, and
wherein, unless the resuming unit accepts the instruction to resume the document scanning within a predetermined time period after the interrupted document feeding is released, the scanning step is canceled.

* * * * *